United States Patent [19]

Horn et al.

[11] Patent Number: 5,051,310
[45] Date of Patent: Sep. 24, 1991

[54] TEXTURED POLYURETHANE MOLDED ARTICLES HAVING MULTIPLE SHEET LAYERS

[75] Inventors: Peter Horn, Heidelberg; Erhard Reich, Damme; Rainer Henning, Muenster, all of Fed. Rep. of Germany

[73] Assignee: BASF Aktiengesellschaft, Ludwigshafen, Fed. Rep. of Germany

[21] Appl. No.: 365,972

[22] Filed: Jun. 14, 1989

[30] Foreign Application Priority Data

Jun. 18, 1988 [DE] Fed. Rep. of Germany ....... 3820704

[51] Int. Cl.$^5$ .............................................. B32B 27/40
[52] U.S. Cl. .................................... 428/423.3; 528/45
[58] Field of Search ................. 428/423.1, 423.3, 35.7, 428/63; 528/44, 45

[56] References Cited

U.S. PATENT DOCUMENTS 4,368,231 1/1983 Egert et al. .......................... 428/220
4,596,835 6/1986 Werner ................................ 521/123
4,970,108 11/1990 Wank et al. ....................... 428/423.1

Primary Examiner—Merrell C. Cashion, Jr.
Attorney, Agent, or Firm—William G. Conger

[57] ABSTRACT

The present invention deals with textured, molded articles having multiple sheet layers, comprising:
  a) an outer coating layer;
  b) a middle layer of a urethane and/or urea group containing film prepared from a heat curable composition storage stable at room temperature; and
  c) a backing layer of non-cellular or cellular polyurethane which optionally can contain an insert and/or reinforcing material.

Moreover, the invention deals with a process for the preparation of said polyurethane molded articles and their use.

7 Claims, No Drawings

TEXTURED POLYURETHANE MOLDED ARTICLES HAVING MULTIPLE SHEET LAYERS

BACKGROUND OF THE INVENTION

1. Field of the Invention

The present invention deals with textured polyurethane molded articles having multiple sheet layers, which comprise:
a) an outer coating layer;
b) a middle layer of a sheet containing urethane groups and/or urea groups prepared from a heat curable composition which is storage stable at room temperature; and
c) a backing layer made from noncellular or cellula polyurethane which optionally contains an insert and/or reinforcing material.

2. Description of Related Art

The preparation of molded foam from polyisocyanate addition polymerization products, for example, from hot or cold molded, or integral skin foams is the subject of numerous patents and publications. Specific examples are: *Advances in Urethane Science and Technology*, Vol. 1 through 8, K. C. Frisch et al, Technomic Publishing Company, Inc., 1971 through 1981; the Monograph of J. H. Saunders and K. C. Frisch *High Polymers*, Vol. XVI, Polyurethanes parts 1 and 2, Verlag Interscience Publishers, 1962 and 1964; or *Integral Skin Foams* by H. Piechota and H. Roehr, Carl Hanser-Verlag, Munich and Vienna, 1975.

If the molded articles made from integral skin foams are not used as, for example, construction elements in the interior of motor vehicles, then the molded foams must be provided with a decorative surface, for example, woven material from plastic or natural fibers or thermoplastic films. The decorative layer can be bonded, for example, with a core layer. Following another process technology, preformed covering materials can be foamed in place. There are basically two methods available for achieving this. Gas impervious covering materials or films are deep drawn in closed molds; or single component or dual component coatings are injected into the mold according to the in mold coating process. After either processing variation, the covering material or the coating layer is subsequently foamed in place (*Plastics Handbook*, Vol. 7 "Polyurethanes", second edition 1983 edited by G. Oertel, Carl Hanser-Verlag, Munich and Vienna).

Typical predominantly used covering materials are polyvinyl chloride (PVC) films or PVC/acrylonitrile-butadiene-styrene (ABS) copolymer films. However, such plastic films have many disadvantages. For achieving the required product applications, material properties such as for example, tear propagation strength, tear elongation, or the correct feel, the PVC or PVC/ABS films generally must be modified by adding plasticizers such as for example, phthalic acid esters. For assuring the necessary thermal stability of approximately 130° C., the aforesaid films must be equipped with heavy metal stabilizers. The plasticizers used either contain, or after curing form volatile constituents which lead to the undesired formation of a coating, particularly on windows, for example the so-called fogging.

As the plasticizer bleeds out over the course of time, the films become rigid, brittle and cracked. Another serious disadvantage is based on the mutual negative influence of PVC and/or PVC/ABS films with poured in place polyurethanes; particularly if the polyurethane foams are prepared in the presence of conventional amine catalysts which results in the rapid embrittlement of the decorative layer. In addition, a problem is the recycling of PVC waste and the formation of HCl in fires.

Numerous experiments were aimed at replacing PVC or PVC/ABS films by other suitable materials such as, for example, films of thermoplastic polyurethanes (TPU). Since TPU films after deep drawing exhibit the so-called memory effect, i.e. in deep drawing the desired, needled upper surface structure is lost, their use did not lead to the desired success. Textured polyurethane films such as for instrument panels, indeed can be manufactured from TPU powder employing a powder sintering process. However, since this method necessitates a significant energy requirement, it is unprofitable and normally only leads to certain light fast polyurethane films.

Textured polyurethane films prepared according to the dual component thermosetting process overcome this disadvantage as seen in *Kunststoffberater* 32, pages 27 through 28, October, 1987, Booklet 10. With the help of this process, molded articles can be obtained having a natural surface structure such as for example, leather grain, seams, etc. The exact proportioning of the polyol and polyisocyanate components pose difficulties in this production process since even small fluctuations in the mix ratio of the starting components lead to a sharp decline in the mechanical properties, particularly in the thermal stability of the films prepared. Moreover, preruns and postruns lead to a significant loss of material.

SUMMARY OF THE INVENTION

The object of the present invention was to develop suitable textured films which had none or only a minor degree of the aforesaid disadvantages and which could be foamed in place or filled with mixtures to form cellular or noncellular polyurethanes.

This object was surprisingly met with the help of a textured, urethane group and/or urea group-containing film which is prepared from a heat curable mixture which is storage stable at room temperature and which can be used as the middle layer (b) for forming the polyurethane molded article.

Accordingly the subject of the present invention is a textured, multiple sheet, layered polyurethane molded article, comprising:
a) an outer coating layer;
b) a middle layer of a sheet containing urethane and-/or urea groups; and
c) a backing layer made from noncellular or cellular polyurethane which optionally contains an insert and/or reinforcing material;
wherein the middle layer (b) comprising a sheet containing urethane and/or urea groups is prepared by curing at 60° C. to 150° C. a heat curable mixture, storage stable at room temperature, which comprises:
i) an organic polyisocyanate;
ii) at least one compound having two hydrogen atoms reactive to isocyanate groups and having an average molecular weight of 250 to 8500;
whereby a room temperature solid organic polyisocyanate (i), in the form of distinct particles having a particle diameter of 0.1 to 150 microns, is deactivated on the particle surface by a chemical reaction with a deactivating agent so that from 0.1 to 20 equivalent percent of the total available isocyanate groups from (i) are reacted with the deactivating agent and the resulting surface modified polyisocyanate is dispersed into at least one compound having two hydrogen atoms reactive to isocyanate groups;

iii) chain extending agents and/or crosslinking agents having an average molecular weight of 62 to 500 and having an average functionality of 2 to 4 and;

iv) catalysts.

The subject of the present invention is also a process for the preparation of textured multiple sheet layered molded articles, comprising:

a) an outer coating layer;
b) a middle layer of a sheet containing urethane and/or urea groups; and
c) a backing layer made of noncellular or cellular polyurethane which optionally contains an insert and/or reinforcing material wherein the coating layer is applied to the textured inside of a mold heated to from 60° to 150° C.

After the coating layer achieves a sufficient viscosity, it is coated with a heat curable composition, comprising:

i) an organic polyisocyanate;
ii) at least one compound having two hydrogen atoms reactive to isocyanate groups and having an average molecular weight of 250 to 8500;
whereby a room temperature solid organic polyisocyanate (i), in the form of distinct particles having a particle diameter or 0.I to 150 microns, is deactivated on the particle surface by a chemical reaction with a deactivating agent so that from 0.1 to 20 equivalent percent of the total available isocyanate groups from (i) are reacted with the deactivating agent and the resulting surface modified polyisocyanate is dispersed into at least one compound having two hydrogen atoms reactive to isocyanate groups;
iii) chain extending agents and/or crosslinking agents having an average molecular weight of 62 to 500 and having an average functionality of 2 to 4 and;
iv) catalysts.

The composition is allowed to cure and then the multiple layered film formed is treated with a reactive, blowing agent-containing or blowing agent-free mixture to form the polyurethane, or the film formed is taken out of the mold and then directly or following interim storage, is treated in a separate processing step with a reactive, blowing agent-containing or blowing agent-free mixture to form the polyurethane and finally the textured multiple sheet layered polyurethane articles of claim 1 are used as construction elements in the automobile industry, preferably as instrument panels or as coverings for doors or as compartment shelves in automobiles.

DESCRIPTION OF THE PREFERRED EMBODIMENT

The polyurethane molded articles of the present invention demonstrate clearly improved light stability and excellent thermal stability. Even at a temperature of 130° C. and over 500 hours no significant discoloration of the molded article occurs. The urethane and/or urea group containing films retain their original extensibility. A particular advantage is that poured in place molded articles, unlike molded articles poured in place with PVC or PVC/ABS films, demonstrate no negative interaction between the polyurethane foam of the poured in place foaming and the film, i.e. the molded articles do not become brittle and they possess excellent film-polyurethane foam-adhesion. Moreover, the films of the middle layer (b) can, for example, be pigmented and in this manner they can be adjusted to the color tone of coating layer (a).

The following pertains to the starting components for the preparation of said molded articles as well as for the preparation of the urethane and/or urea group containing sheet used as middle layer (b):

1) For achieving an essentially light stable surface, said polyurethane molded articles are provided with a covering layer made of a coating. Suitable, preferably quick curing coating systems, are applied to the surface of the mold, efficaciously heated, and treated with a release agent. Typical examples are polyester coatings which are partially solvent free and therefore dry quickly; epoxide coatings which have a high hiding power, as do polyester coatings; and preferably polyurethane coatings which demonstrate excellent adhesion due to their chemical relationship to urethane and/or urea groups; whereby the bonding to the films occurs partially via reactant groups in the film. The polyurethane coatings are normally solvent free, demonstrate a good mechanical property level and most preferably, have a high elasticity. For shortening the drying times, the polyurethane coatings are efficaciously dried at 60° C. to 150° C., more preferably, 80° C. to 110° C.

Release coatings are also suitable for forming coating layer (a) which on one hand demonstrate good adhesion to the urethane and/or urethane group containing films however, on the other hand, they do not adhere to the mold material. These release coatings are applied to the surface of the mold in a conventional fashion for example, preferably by spraying and thus one can dispense with an additional release agent.

The outer covering layer (a) efficaciously has a thickness of 0.01 to 200 microns, more preferably 0.4 to 100 microns, whereby the coating system is applied in a quantity of 0.15 to 60 g/m$^2$, more preferably 6 to 30 g/m$^2$, calculated as a solvent free dried composition.

2) Middle layer (b) of the molded article in this invention comprises a film containing urethane and/or urea groups which is prepared by curing at 60° C. to 150° C., more preferably 80° C. to 130° C., a heat curable composition storage stable at room temperature which comprises:

i) an organic polyisocyanate;
ii) at least one compound having two hydrogen atoms reactive to isocyanate groups and having an average molecular weight of 250 to 8500;
whereby a room temperature solid organic polyisocyanate (i), in the form of distinct particles having a particle diameter of 0.1 to 150 microns, is deactivated on the particle surface by a chemical reaction with a deactivating agent so that from 0.1 to 20 equivalent percent of the total available isocyanate groups from (i) are reacted with the deactivating agent and the resulting surface modified polyisocyanate is dispersed into at least one compound having two hydrogen atoms reactive to isocyanate groups; .
iii) chain extending agents and/or crosslinking agents having an average molecular weight of 62 to 500 and having an average functionality of 2 to 4 and;
iv) catalysts.

Suitable room temperature storage stable, heat curable compositions of the aforesaid type are known and are disclosed, for example, in EP-A-0 062 780 (U.S. Pat. No. 4,400,497), EP-A-0 100 507 (U.S. Pat. No. 4,507,456) and EP-A-0 100 508 (U.S. Pat. No. 4,525,570).

The following starting materials are efficaciously used in preparing said compositions:

Typical organic polyisocyanates (i) are conventional, commercially readily available, aliphatic, cycloaliphatic, aromatic, cycloaliphatic-aliphatic, and aromaticaliphatic multivalent isocyanates which as long as their melting point is not over 30° C., are efficaciously modified by suitable methods.

Individual examples are: alkylene diisocyanates having 2 to 12, more preferably 4 to 6, carbon atoms in the alkylene radical such as 1,2-ethane diisocyanate; 1,4-butane diisocyanate; 2-ethyl-1,4-butane diisocyanate; 2-methyl-1,5-pentane diisocyanate; 1,6-hexane diisocyanate; 2-ethyl-1,6-hexane diisocyanate; 1,8-octane diisocyanate; 1,10-decane diisocyanate; and 1,12-dodecane diisocyanate; cycloaliphatic diisocyanates such as for example, 1,3- and 1,4-cyclohexane diisocyanate as well as optional mixtures of their isomers 4,4'-, 2,2'- and 2,4'-dicyclohexylmethane diisocyanate; as well as optional mixtures of at least two of these isomers; arylaliphatic diisocyanates such as for example, 1,2-, 1,3- and 1,4-xylylene diisocyanate and 2,3,5,6-tetramethyl-1,4-xylylene diisocyanate, and aromatic polyisocyanates such as for example, 4,4'-, 2,4'- and 2,2'-diisocyanatodiphenylmethane and the corresponding mixtures of at least two of these isomers, 2,4- or 2,6-diisocyanatotoluene and the corresponding isomeric mixtures, 1,5-diisocyanatonaphthalene, polyphenyl polymethylene polyisocyanates and mixtures of the isomeric diisocyanatodiphenylmethanes and polyphenyl polymethylene polyisocyanates. The aforesaid diand polyisocyanates can be used individually or in the form of mixtures.

The so-called modified multivalent isocyanates are also suitable, i.e. products which are obtained by the chemical reaction of the above-mentioned di- and/or polyisocyanates. Individual examples are, room temperature solid di- and/or polyisocyanates containing ester, urea biuret, allophonate, carbodiimide, and preferably urethane, uretdione, and/or isocyanurate groups.

Room temperature solid di- and/or polyisocyanates which are primarily insoluble in the compounds having at least two reactive hydrogen atoms (ii) or which are only soluble in small quantities, which have been used successfully and are therefore preferred are 4,4'-diisocyanatodiphenylmethane and 1,5-naphthalene diisocyanate and diand/or polyisocyanates modified with urea, urethane uretdione ester and/or isocyanurate groups, based on 1,6-hexane diisocyanate, 1-isocyanato-3,3,5-trimethyl-5-(isocyanato-methyl)cyclohexane, 2,3,5,6-tetramethyl-1,4-xylylene-diisocyanate, 2,4'- and 4,4'-diisocyanatodiphenylmethane and most preferably 2,4- and/or 2,6-diisocyanatotoluene.

Modified polyisocyanates of the preferred type are most preferably addition products of diisocyanatotoluenes and trimethylolpropane, trimerized isocyanurate group-containing diisocyanatotoluenes and diisocyanatodiphenylmethanes and dimerized uretdione group-containing diisocyanatotoluenes, 4,4'- and/or 2,4'-diisocyanatodiphenyl methanes as well as diisocyanato aryl ureas having the following general structural formula:

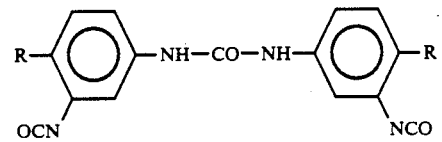

in which R is a lower molecular weight, linear or branched alkyl radical having I to 4 carbon atoms, for example, methyl; alkoxy having 1 to 4 carbon atoms, for example, ethoxy; or a halogen atom, for example, chlorine; and diisocyanato benzoic acid phenyl esters having the following general structural formula:

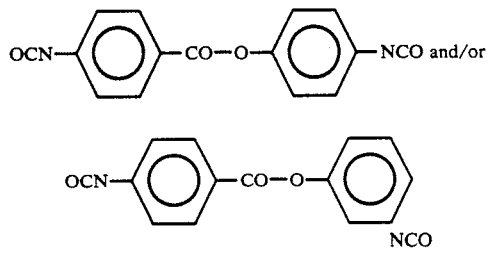

Most preferred are modified diisocyanates containing uretdione groups in bonded form based on 2,4- and/or 2,6 diisocyanatotoluene, 2,4'- and/or 4,4'-diisocyanatodiphenylmethane, 1,6-hexanediisocyanate and 1-isocyanato3,3,5-trimethyl-5-(isocyanato-methyl)-cyclohexane, whereby in the preparation of light-fast films, most preferably compositions based on aliphatic or cycloaliphatic modified diisocyanates as well as 2,3,5,6-tetramethyl-1,4-xylylene diisocyanate are used. The organic and/or modified organic polyisocyanates (i) can be used individually or in the form of mixtures.

Compounds having at least two reactive hydrogen atoms are preferably those having a functionality of 2 to 8, more preferably, 2 to 4 and most preferably 2 and/or 3, and have a molecular weight from 250 to 8500, more preferably 600 to 5600, and most preferably 1800 to 4000 whereby as a function of, for example, the structure, molecular weight, and the functionality of the compounds, the final products containing urethane and/or urea groups made from the foam compositions can be varied in a conventional fashion from flexible to brittle hard. Particularly suitable are, for example, polyether polyamines, hydroxyl group containing polyether polyamines and/or more preferably polyols selected from the group consisting of polyether polyols, polymer modified polyether polyols, polyester polyols, polythioether polyols, hydroxyl group containing or hydroxyl group free polyester amides, hydroxyl group containing polyacetals and hydroxyl group-containing aliphatic polycarbonates or mixtures of the polyether polyamines and polyols or mixtures of at least two of the aforesaid polyols. Preferably used are polyester polyols and/or most preferably polyether polyols.

Suitable polyester polyols may be prepared, for example, from organic dicarboxylic acids having from 2 to 12 carbon atoms, preferably aliphatic dicarboxylic acids having from 4 to 6 carbon atoms, and polyfunctional alcohols, for example, diols having from 2 to 12 carbon atoms, preferably from 2 to 6 carbon atoms. Typical dicarboxylic acids are: succinic acid, glutaric acid, adipic acid, suberic acid, azelaic acid, sebacic acid, decanedicarboxylic acid, maleic acid, and fumaric acid.

The dicarboxylic acids may be used individually or as mixtures Instead of the free dicarboxylic acids, corresponding dicarboxylic acid derivatives may also be used, for example, the dicarboxylic acid esters of alcohols having from 1 to 4 carbon atoms or dicarboxylic anhydrides. Preferred are dicarboxylic acid mixtures of succinic, glutaric, and adipic acid in proportions of, for example, 20-35:35-50:20-32 parts by weight, respectively, and most preferably adipic acid. Examples of difunctional and polyfunctional alcohols, in particular diols, are: ethanediol, diethylene glycol, 1,2- and/or 1,3-propanediol, dipropylene glycol, 1,4-butanediol, 1,5-pentanediol, and 1,6-hexanediol, or mixtures of at least two of the cited diols, more preferably mixtures of 1,4-butanediol, 1,5-pentanediol, and 1,6-hexanediol. In addition, polyester polyols of lactones, for example, ε-caprolactone, or hydrocarboxylic acids, for example, ω-hydroxycaproic acid may be used.

The polyester polyols preferably have a functionality of from 2 to 3 and a molecular weight of from 1000 to 3000, preferably from 1800 to 2500.

Preferred for use as polyols are polyether polyols prepared by anionic polymerization of cyclic ethers with alkali hydroxides as catalysts, for example, sodium hydroxide or potassium hydroxide, or alkali alcoholates, for example, sodium methylate, sodium or potassium ethylate, or potassium isopropylate, or by the cationic polymerization with Lewis acids such as antimony pentachloride, boron trifluoride etherates, etc., or bleaching earth as catalysts. Preferably used as alkylene oxides are those having from 2 to 4 carbon atoms in the alkylene radical. The preferred initiator molecule contains from 2 to 8, preferably from 2 to 4, reactive hydrogen atoms bonded to it.

Suitable cyclic ethers are, for example, tetrahydrofuran, styrene oxide, and epichlorohydrin, and alkylene oxides such as 1,2- and 2,3-butylene oxide, and preferably ethylene oxide and 1,2-propylene oxide. The cyclic ethers may be used individually, alternating one after another, or as mixtures. Typical initiator molecules which may be used are: water, organic dicarboxylic acids such as succinic acid, adipic acid, phthalic acid, and terephthalic acid. Aliphatic and aromatic, optionally N-mono-, N,N- and N,N'-dialkyl substituted diamines having from 1 to 4 carbon atoms in the alkyl radical, such as optionally mono- and dialkyl-substituted ethylene diamine, 1,4-butylenediamine, 1,2-, 1,3-, 1,4-, 1,5- and 1,6-hexamethylenediamine, phenylene diamine, 2,4- and 2,6-toluylene diamine and 4,4'-, 2,4'- and 2,2'-diaminodiphenylmethane can be utilized.

Typical initiators which may be used are alkanol amines such as ethanolamine, diethanolamine, N-methyl- and N-ethylethanolamine, N-methyl- and N-ethyldiethanolamine, and triethanolamine, ammonia. Preferably used are polyfunctional, more preferably di- and/or trifunctional alcohols such as ethanediol, 1,2-propanediol and 1,3-propanediol, diethylene glycol, dipropylene glycol, 1,4-butanediol, 1,6-hexanediol, glycerin, trimethylolpropane, pentaerythritol, sorbitol, sucrose, and saccharose.

The polyether polyols, preferably polyoxypropylene-, polyoxypropylene-polyoxyethylene- and polyoxytetramethylene-glycols have a functionality of from 2 to 4 and molecular weights from 250 to 8500, more preferably from 600 to 5600, most preferably from 1800 to 4000. As with the polyester polyols, they may be used individually or in the form of mixtures. They may also be mixed with the polyester polyols as well as the hydroxyl group-containing polyesteramides, polyacetals, polycarbonates, and/or polyetherpolyamines.

Polymer modified polyether polyols or mixtures of polyether polyols and polymer modified polyether polyols may also be used in place of the aforesaid polyether polyols. Suitable polymer modified polyether polyols contain efficaciously 2 to 50 weight percent, or preferably 3 to 25 weight percent, based on the total weight, of inorganic fillers such as, for example, kaolin or aluminum oxide; organic fillers such as, for example, carbon, rosin or melamine or polymer particles whereby the polymer particles preferably are selected from the group consisting of polyureas, polyhydrazides, polyurethanes containing tertiary amino groups in bonded form, and graft polymers which preferably are prepared by the in situ polymerization of olefinic unsaturated monomers, most preferably styrene and/or acrylonitrile in the above-mentioned polyether polyols. Examples of such polymer modified polyether polyols and processes for their preparation are disclosed in EP-B 00 11 752 (U.S. Pat. No. 4,304,708), U.S. Pat. No. 4,374,209 and DE-A-32 31 497.

Typical hydroxyl group-containing polyacetals which may be used are compounds which may be produced from glycols such as diethylene glycol, triethylene glycol, 4,4'-dihydroxyethoxy-diphenyldimethylmethane, hexanediol, and formaldehyde. Suitable polyacetals may also be prepared through the polymerization of cyclic acetals.

Typical hydroxyl group-containing polycarbonates which may be used are those of the essentially known type which may be prepared through the reaction of diols such as 1,3-propanediol, 1,4-butanediol, and/or 1,6-hexanediol, diethylene glycol, triethyleneglycol, or tetraethylene glycol with diaryl carbonates such as diphenyl carbonate, or phosgene.

Among the polyester amides which may be used are, for example, those obtained from polyfunctional saturated and/or unsaturated carboxylic acids or their anhydrides and polyfunctional saturated and/or unsaturated amine alcohols or mixtures of polyfunctional alcohols and amine alcohols and/or polyamines, preferably linear condensates.

Suitable polyether-polyamines may be prepared from the polyether polyols cited above. Examples of preparation methods are the cyano-alkylation of polyoxyalkylene polyols and the subsequent hydrogenation of the nitrile which is formed (U.S. Pat. No. 3,267,050) or the amination of polyoxyalkylene polyols with amines or ammonia in the presence of hydrogen and catalyst (Federal Republic of Germany Patent No. 12 15 373) whereby the hydroxyl groups are either partially or completely aminated.

The storage stable, heat curable compositions of the present invention comprising an organic polyisocyanate (i), at least one compound having reactive hydrogen atoms (ii), chain extending agents and/or crosslinking agents (iii) and catalysts (iv) contain the polyisocyanates (i) in the form of discrete particles having particle diameters of 0.1 to 150 microns, more preferably, 1 to 50 microns, dispersed in (ii), or in (ii) and (iii).

In order to prevent an addition polymerization reaction at room temperature between the organic polyisocyanates and starting components (ii) and (iii) the dispersed polyisocyanate particles are deactivated on their surface. The deactivating agent is efficaciously chosen so that chemical or physical forces are associated with the surface of the polyisocyanate particles and in this manner phase separation is achieved between deactivated polyisocyanate particles and the remaining starting components (ii) through (iv).

For the chemical deactivation, 0.01 to 20, more preferably 0.1 to 10 and most preferably 0.3 to 5 equivalent percent of the total available isocyanate groups are reacted with the deactivating agent.

In addition, the deactivating agent can be added to the formulations in the claimed equivalent ratios. Also suitable is a process in which the deactivating agent is added in an excess over the claimed equivalent ratio.

After coating the surface of the dispersed phase with the deactivating agent the deactivating reaction is terminated.

Typical deactivating agents are: water, primary or secondary aliphatic mono- or polyamines, mono- and polyalcohols. Most preferred are longer chain aliphatic monoamines, for example, stearyl amine which react into a type of grafted emulsifier. Higher molecular weight aliphatic polyamines such as, for example, polyamide amines and hydroxyl terminated polymers such as, for example, hydroxyl terminated polybutadienols react to form grafted protective colloids. Most preferred for deactivating the isocyanate groups on the surface of the polyisocyanate particles, i.e. for stabilizing dispersions of components (i) through (iii), are also reactions which convert the isocyanates into urea and/or polyurea structures because these are insoluble in most polyols and organic solvents. Reagents forming ureas and/or polyureas are water and primary or secondary aliphatic amines whereby short chain aliphatic diamines such as ethylene diamine or propylene diamine are preferred. The polyureas formed from these short chain aliphatic diamines are more organophobic than those formed from long chain amines and therefore possess a better stabilizing effect in many instances.

Other deactivating agents are: compounds containing carboxyl groups such as, for example, homo- and copolymers of acrylic acid, methacrylic acid, maleic acid, and other polymerizable acids, acidic polycondensation products such as for example, polyesters prepared with an excess amount of acid, acidic polymers obtained by the reaction of adducts of maleic acid anhydride with unsaturated polymers, for example, linseed oil or hydroxyl-terminated polybutadiene polymers; amide group containing compounds such as, for example, soluble polyamides and polymers of acrylamide and methacrylamide or copolymers of acrylamide and/or methacrylamide with acrylic acid and/or methacrylic acid esters.

Reaction products are preferably used as deactivating agents which are prepared by reacting one mole of a primary organic amine having 2 to 32, more preferably 6 to 18 carbon atoms selected from the group consisting of aromatic, aliphatic, cycloaliphatic, cycloaliphaticaliphatic and aromatic-aliphatic diamines or mixtures thereof with 1.5 to 2.5 moles, more preferably 1.8 to 2.2 moles and most preferably about 2 moles of an organic monocarboxylic acid having at least 6 carbon atoms, more preferably 12 to 36 carbon atoms and most preferably 12 to 18 carbon atoms at a temperature in a range of approximately 10° C. to 100° C., more preferably 20° C. to 80° C.

Examples of suitable primary organic amines are: linear or branched aliphatic diamines having 2 to 12, more preferably 6 to 12 carbon atoms such as for example, 1,2-ethylenediamine, 1,2- and/or 1,3-propylenediamine, 1,4-butylenediamine, 4-methyl-pentamethylene-1,5-diamine, 1,5-pentamethylene-diamine, 2,2,4-trimethyl-hexamethylene-1,6-diamine, 1,6-hexamethylene-diamine, 1,8-octamethylenediamine, 1,10-decamethylene-diamine and 1,12-dodecamethylene-diamine; cycloaliphatic diamines having 6 to 10 carbon atoms such as for example, cyclohexane-diamines as well as optional mixture of the isomers, 2,4- and/or 2,6-hexahydrotoluylenediamine and isophorone diamine; cycloaliphatic-aliphatic diamines having 8 to 32 carbon atoms, more preferably, 13 to 21 carbon atoms such as for example, 1,4-hexahydroxylxylylene diamine, 4,4'-,2,4'-, and 2,2'-dicyclohexylmethane diamine as well as optional mixtures of the isomers, 3,3'-dialkyl- and 3,3',5,5'-tetraalkyl-4 4'-dicyclohexylmethane diamines having from 1 to 4 carbon atoms in a linear or branched alkyl radical such as, for example, 3,3'-dimethyl-, 3,3'-isopropyl-, 3,3',5,5'-tetramethyl-, 3,3',5,5'-tetraethyl- or 3,3',5,5-isopropyl-4,4'-diaminodicyclohexylmethane; aromatic diamines having 6 to 12 carbon atoms such as, for example, phenylenediamines, 2,4- and 2,6-toluylenediamine and the corresponding isomeric mixtures and naphthalenediamines and aromatic-aliphatic diamines having 8 to 32 carbon atoms, more preferably, 13 to 21 carbon atoms such as, for example, xylylenediamine, 4,4'-, 2,4'- and 2,2'-diamino-diphenylmethane, 3,3'-dialkyl- and 3,3',5,5'-tetraalkyl-4,4'-diaminodiphenylmethane, having 1 to 4 carbon atoms in a linear or branched alkyl radical such as, for example, 3,3'-dimethyl-, 3,3'-diethyl-, 3,3',5,5'-tetramethyl-, 3,3',5,5'-tetraethyl-, 3,3',5,5'-tetraisopropyl-, 3,5-dimethyl-3',5'-diethyl-, and 3,5-dimethyl3',5'-diisopropyl-4,4'-diamino-diphenylmethane and 4,4'- diaminodiphenyl-2,2-propane. The aforementioned organic primary diamines can be used individually or in the form of mixtures. Preferably used are aliphatic, cycloaliphatic or cycloaliphatic-aliphatic primary diamines having 6 to 21 carbon atoms.

Aromatic monocarboxylic acid or their anhydrides are examples of organic monocarboxylic acids having at least 6 carbon atoms, more preferably 12 to 36 carbon atoms, such as for example, benzoic acid, o-, m-, p-toluic acid and/or anisic acid. The aromatic monocarboxylic acids can optionally be substituted partially or completely by an equivalent quantity, with respect to the carboxyl groups, of a polycarboxylic acid such as for example, phthalic acid, trimellitic acid or pyromellitic acid or their anhydrides.

However, most preferred are aliphatic or cycloaliphatic, saturated or unsaturated carboxylic acids or their anhydrides having preferably at least 12 to 36 carbon atoms and most preferably 12 to 18 carbon atoms. Typical examples are natural or synthetic monocarboxylic acids and/or natural fatty acid mixtures such as for example, abietic acid, palmitic acid, stearic acid, oleic acid, elaidic acid, linoleic acid, ricinoleic acid, linolenic acid or even commercially produced fatty acid mixtures such as sperm oil fatty acid, fish oil fatty acid, tallow fatty acid, soybean oil fatty acid, palm nut oil fatty acid, peanut oil fatty acid or talloleic fatty acid. Preferred are stearic acid and/or fatty acids liquid at room temperature, most preferably, oleic acid or industrial fatty acid mixtures containing oleic acid.

Aryl sulfonic acids such as, for example, benzene sulfonic acids and/or toluene sulfonic acids are also examples.

The reaction products used as the deactivating agent preferably are present as salts. However, also suitable are carboxylic acid amides prepared from the diamines and monocarboxylic acids and the carboxylic acid amides containing salt residues and mixtures from the previously mentioned carboxylic acid amides and salts whereby the quantity ratios of the individual components can be varied over a broad range.

Reaction products which have been used successfully and are therefore preferred as the deactivating agent are prepared from 1 mole of 3,3'-dimethyl-4,4'-diaminodicyclohexylmethane and from about 2 moles of stearic acid and/or most preferably, oleic acid.

The storage stable, heat curable compositions contain other compounds which are reactive with the isocyanate groups and they are chain extending agents and/or crosslinking agents (iii) having an average molecular weight of 62 to 500, more preferably, 62 to 300 and having a functionality of 2 to 4, more preferably 2 to 3 and efficaciously they have either hydroxyl groups in bonded form on the aliphatic and/or cycloaliphatic radicals, and/or amino groups in bonded form on the aromatic radicals. Typical examples of such chain extending agents or cross linking agents are: multivalent alcohols with primary and/or secondary hydroxyl groups in bonded form on the aliphatic or cycloaliphatic radical such as, for example, 1,2 ethanediol, 1,2- and 1,3-propanediol, 2,2-dimethyl-1,3-propanediol, 1,3-,1,4- and 2,3-butanediol, 1,5- and 2,5-pentanediol, 1,6-hexanediol, 1,4-bis-(hydroxymethyl)-cyclohexane, 1,4-dihydroxycyclohexane, 1-hydroxymethyl-4-hydroxycyclohexane, 4,4'-dihydroxy-dicyclohexylmethane, 4,4'-(dihydroxy-dicyclohexyl)-2,2-propane, 1,4-dihydroxyethyl-hydroquinone, trimethylolethane, trimethylolpropane, 1,2,6-hexanetriol, glycerin and pentaerythritol. Also suitable are multivalent alcohols containing tertiary amino groups in bonded form such as, for example, N-alkyl-dialkanolamines, N-methyldiethanolamine and triethanolamine and N,N'-bis-hydroxyethylpiperazine. Preferably used are divalent and trivalent alcohols such as 1,2-ethanediol, 1,4-butanediol, 1,6-hexanediol, glycerin and trimethylolpropane and lower molecular weight hydroxyl group containing polyoxyalkylene polyethers based on ethylene oxide and/or 1,2-propylene oxide, and the aforementioned multivalent alcohols or aliphatic diamines having molecular weights from 60 to 116 as an initiator molecule.

Aromatic polyamines are also suitable as starting component (iii) as well as amino group containing heterocycles whose heterocyclic radical possesses an aromatic character.

Primary aromatic diamines are preferably used as the aromatic amine in preparing the composition of the present invention.

Efficaciously, one uses aromatic diamines whose primary amino groups do not demonstrate a reduced reactivity to polyisocyanates caused by electron-withdrawing substitutents and advantageously such aromatic diamines are those having primary amino groups which are sterically hindered. Most preferred of the aforesaid type are primary aromatic diamines which are liquid at room temperature and which are entirely or at least partially miscible with the compounds (ii) under processing conditions. Preferred are, for example, meta-phenylenediamine and/or more preferably, alkyl substituted meta-phenylene diamines having the following structural formula:

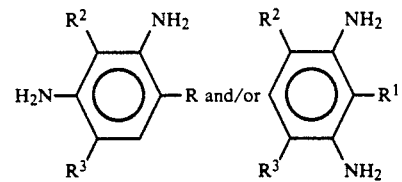

in which $R^1$ is a hydrogen atom or a linear or branched alkyl radical having from 1 to 10 carbon atoms, preferably from 1 to 6 carbon atoms, and $R^2$ and $R^3$ are identical or different linear or branched alkyl radicals having from 1 to 3 carbon atoms, such as the methyl, ethyl, propyl, or isopropyl. Preferred are those alkyl radicals $R^1$ where the branching point is at the $C_1$ carbon atom. In addition to hydrogen, the following $R^1$ alkyl radicals are typical: methyl-, ethyl-, n-propyl-, isopropyl-, butyl-, hexyl-, octyl-, decyl-, 1-methyloctyl-, 2-ethyl-octyl-, 1-methyl-hexyl-, 1,1-dimethylpentyl-, 1,3,3-trimethylhexyl-, 1-ethylpentyl-, 2-ethylpentyl-, and preferably the cyclohexyl-, 1-methyl-n-propyl-, tert-butyl-, 1-ethyl-n-propyl-, 1-methyl-n-butyl-, and 1,1-dimethyl-n-propyl.

Typical alkyl substituted m-phenylenediamines which may be used are: 2,4-dimethyl-, 2,4-diethyl-, 2,4-diisopropyl-, 2,4-diethyl-6-methyl-, 2-methyl-4,6-diethyl-, 2,4,6-triethyl-, 2,4-dimethyl-6-cyclohexyl- 2-cyclohexyl-4,6-diethyl-, 2-cyclohexyl-2,6-diisopropyl-, 2,4-dimethyl-6-(1,1-dimethyl-n-propyl)-, and 2-(1-methyl-n-butyl)-4,6-dimethyl-1,3-phenylenediamine.

Diaminodiphenylmethanes have also been used successfully, for example, 4,4'- and/or 2,4'-diaminodiphenylmethane, 3,3'-di- and 3,3',5,5'-tetra-n-alkylsubstituted 4,4'-diamino diphenylmethanes such as 3,3'-diethyl-, 3,3',5,5'-tetraethyl- and 3,3',5,5'-tetra-n-propyl-4,4'-diaminodiphenylmethane.

Preferably used are diaminodiphenylmethanes of the formula:

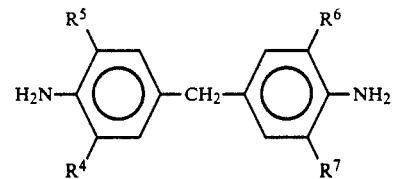

in which $R^4$, $R^5$, $R^6$ and $R^7$ are identical or different and are a methyl, ethyl, propyl, isopropyl, sec-butyl, or tertbutyl radical, and whereby at least one of the radicals must be an isopropyl or sec-butyl radical. The 4,4'-diaminodiphenylmethanes may also be used in mixtures with isomers of formulas:

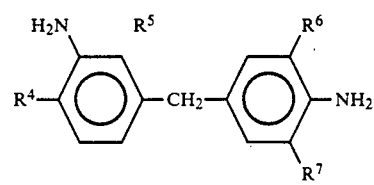

and/or

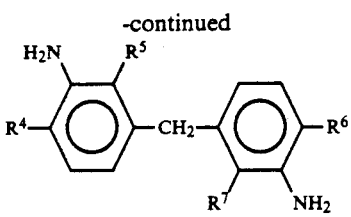

whereby $R^4$, $R^5$, $R^6$, and $R^7$ have the meaning stated above.

Typical examples are: 3,3',5-trimethyl-5'-isopropyl-diamino-diphenylmethane, 3,3',5-triethyl-5'-isopropyl-diamino-diphenylmethane, 3,3',5-trimethyl-5-sec-butyl-diamino-diphenylmethane, 3,3',5-triethyl-5'-sec-butyl4,4'-diamino-diphenylmethane, 3,3'-dimethyl-5,5'-diisopropyl-diamino-diphenylmethane, 3,3'-diethyl-5,5'-diisopropyl-diamino-diphenylmethane, 3,3'-dimethyl-5,5'-di-sec-butyl-diamino-diphenylmethane, 3,3'-diethyl-5,5'-di-sec-butyl-diamino-diphenylmethane, 3,5-dimethyl-3',5'-diiso-propyl-diamino-diphenylmethane, 3,5-diethyl-3',5'-diisopropyl-, 3,5'-dimethyl-3',5'-di-sec-butyl-diamino-diphenyl-methane, 3,5-diethyl-3',5'-di-sec-butyl-diamino-diphenylmethane, 3,5'-diamino-diphenylmethane, 5',3'-triisopropyldiamino-diphenylmethane, 3-ethyl-3',5,5'-triisopropyldiamino-diphenylmethane, 3-ethyl-3',5,5'-triisopropyldiamino-diphenylmethane, 3-methyl-3',5,5'-tri-sec-butyldiamino-diphenylmethane, 3-ethyl-3',5,5'-tri-sec-butyl-4,4'-diaminodiphenylmethane, 3,3'-diisopropyl-5,5'-di-sec-butyldiamino-diphenylmethane, 3,5-diisopropyl-3',5'-di-sec-butyldiamino-diphenylmethane, 3-ethyl-5-sec-butyl-3',5'-diisopropyldiamine-diphenylmethane, 3-methyl-5-tert-butyl-3',5'-diisopropyl-diamino-diphenylmethane, 3-ethyl-5-secbutyl-3'-methyl-5'-tert-butyl-diamino-diphenylmethane, 3,3',5,5'-tetraisopropyl-diamino-diphenylmethane, and 3,3',5,5'-tetra-sec-butyl-4,4'-diaminodiphenylmethane.

Preferably used are the following primary aromatic alkyl substituted phenylene diamines and diamino-diphenylmethanes: 2,4-diethyl-, and 2,4-dimethyl-1,3-phenylenediamine; 2,4-diethyl-6-methyl-, and 2-methyl-4,6-diethyl1,3-phenylenediamine; 2,4,6-triethyl-1,3-phenylenediamine, 2,4-dimethyl-6-tert-butyl-1,3-phenylenediamine, 2,4-dimethyl-6-isooctyl-1,3-phenylenediamine, and 2,4-dimethyl-6-cyclohexyl-1,3-phenylenediamine, as well as 3,5-dimethyl3',5'-diisopropyl-and 3,3',5,5'-tetraisopropyl-4,4'-diaminodiphenylmethane.

The primary aromatic diamines may be used individually or in the form of mixtures, for example, mixtures of optionally alkyl-substituted 1,3-phenylenediamines, diaminodiphenylmethanes, 3,3'-di- and/or 3,3',5,5'-tetra-alkylsubstituted 4,4'-diaminodiphenylmethanes.

Examples of secondary aromatic diamines are: N,N'-dialkyl-substituted aromatic diamines which optionally can be alkyl substituted on the aromatic ring, having 1 to 20, more preferably, 1 to 4 carbon atoms in the N-alkyl radical such as N,N'-diethyl-, N,N'-di-sec-pentyl-, N,N'-di-sec-hexyl-, N,N'-di-sec-decyl-, N,N'-di-cyclohexyl-p- and/or -m-phenylenediamine, N,N'-dimethyl-, N,N'-diethyl-, N,N-diisopropyl-, N,N'-di-sec-butyl-, N,N'-dicyclohexyl-4,4'-diamino-diphenylmethane and N,N'-di-sec-butyl-benzidine.

Preferred as chain extending agents and/or cross linking agents (iii) are the industrially readily available alkanediols having 2 to 6 carbon atoms; alkanetriols having 3 to 6 carbon atoms, dialkylene glycol ethers having 4 to 8 carbon atoms, alkyl substituted phenylene-diamines, 3,3'-di-and/or 3,3', 5,5'-tetraalkyl-substituted 4,4'-diaminodiphenylmethanes.

The following have been used successfully and are therefore most preferred as the (iii) component: 2,4-diethyl-6-methyl-1,3-phenylenediamine, mixtures of 2,4-diethyl-6-methyl- and 2-methyl-4,6-diethyl-1,3-phenylenediamine, and mixtures of methyl-diethyl-1,3-phenylenediamines and at least one compound selected from the group consisting of alkanediols having 2 to 6 carbon atoms dialkyleneglycolether having 4 to 8 carbon atoms, glycerin and trimethylolpropane.

The chain extending agents and/or cross linking agents (iii) or their mixtures are used in the following quantities in the preparation of the foam compositions: 0.5 to 25 parts by weight, more preferably, 5 to 20 parts by weight and most preferably, 8 to 18 parts by weight, based on 100 parts by weight of at least one compound having 2 hydrogen atoms reactive to isocyanate groups.

Catalysts (iv) are added to the storage stable, heat curable compositions in order to accelerate the reaction of urethane formation of the hydroxyl group containing starting components (ii) and (iii) and the deactivated organic polyisocyanates (i). Most preferred as catalysts are metal salts and metal acetyl acetonates. Individual example are: lead naphthenate, bismuth(III) stearate, zinc stearate, lead(II)octanoate, tin octanoate, phenylmercury octanoate, iron(III)acetyl acetonate, iron(II)acetyl acetonate, cobalt(II)acetyl acetonate, zinc(II)acetyl acetonate; manganese acetyl acetonate, cerium-(IV)acetyl acetonate, titanium(IV)acetyl acetonate, zirconium(IV)acetyl acetonate, bis-lauryltin dimercaptide, 2,3,4,6,7,8,9,10-octahydro-pyramido-1,2-azepine or mixtures of at least two of the aforesaid catalysts whereby preferably used is a combination of lead naphthenate and bismuth (III)stearate efficaciously in a weight ratio 2 to 1:1. Normally used is 0.1 to 3 weight percent, more preferably 0.3 to 1 weight percent of catalyst based on the total weight of the component (ii).

Auxiliaries and/or additives may also be incorporated into the compositions of the present invention. Typical examples are: pigments, dyes, agents to protect against hydrolysis, ultraviolet stabilizers, antioxidants and plasticizers.

Typical pigments are those conventional ones known for polyisocyanate addition polymerization products. Individual examples are: black paste, copper, aluminum and iron powder, zinc dust, iron oxide, cadmium sulfide, etc.

Most preferred as plasticizers are those containing in bonded form NCO group reactive radicals. Individual examples are: 1,4-butanediol-1,6-hexanediolpolyadi-pates, ketone zesins prepared from cyclohexanone and formaldehyde and dissolved in castor oil, for example, those having a hydroxyl number of about 165; polycondensation products prepared from phthalic anhydride, adipic acid, oleic acid, ethylene glycol and glycerin, for example, having a hydroxyl number of 370, or prepared from phthalic acid anhydride, adipic acid, oleic acid and trimethylolpropane; and alkyl epoxy stearates. The plasticizers are ordinarily used in quantities of 0.5 to 10 weight percent, more preferably 1 to 6 weight percent based on the total weight of the composition.

Further information on the above-mentioned auxiliaries and/or additives and on other auxiliaries and/or additives may be found in the technical literature, for example, the monograph of J. H. Saunders and K. C.

Frisch *High Polymers* Vol. XVI, Polyurethanes parts 1, and 2, Verlag Interscience Publishers 1962 and/or 1964; or in the *Plastics Handbook*, Vol. VII, Polyurethanes first edition 1966 or second edition 1983, Carl Hanser Verlag, Munich.

Preparing the compositions occurs following known conventional processes, for example, disclosed in EP-A-062 780, EP-A-100 507 or EP-A-100 508, efficaciously while using ordinary dispersing and mixing equipment. The organic polyisocyanate (i) is advantageously dispersed at temperatures below 40° C., more preferably at temperatures of from 0° C. to 25° C. in a mixture of starting components (ii) through (iv) or (ii) and/or (iii), or preferably in at least one compound having two hydrogen atoms (ii) reactive to isocyanate groups, whereby the composition of starting component (ii) either already contains the total amount of one or more deactivating agents o shortly after the dispersing procedure, at least one of the deactivating agents is added to the compositions or starting component (ii). Both modes of processing can be combined with one another whereby starting components (ii) and/or (iii), for example, can contain a portion of the deactivating agent while another portion of the same or another deactivating agent is added to the composition after dispersing the polyisocyanate. If only starting component (ii) or a mixture of (ii) and (iii) are used as a coherent phase for dispersing the polyisocyanate then the remaining starting materials are incorporated into the composition, for example, starting component (iv), subsequent to the resulting dispersion. Understandably, the polyisocyanate dispersion can also be mixed with the starting components (ii) and/or (iii) used in its preparation.

In preparing the compositions, the quantity ratios of starting components (i) through (iii) can be varied over a broad range, for example, in ratios from 0.8 to 2.5:1 of free isocyanate groups to hydroxyl, amino groups or to the total of the hydroxyl and amine groups. Compositions which contain the deactivated polyisocyanates in high concentrations, for example, in NCO:OH and/or $NH_2$ and/or OH-plus $NH_2$ group ratios of 10:1 to 3:1, more preferably 5:1 to 3:1, they can be used as a so-called masterbatch and diluted before processing with components (ii) and/or (iii).

In preparing the urethane and/or urea group containing films of the middle layer, compositions are preferably used in which the ratio of NCO:OH and/or $NH_2$ groups is 0.8 to 2.5:1, more preferably 0.9 to 1.2:1.

The compositions are efficaciously flowable and at 23° C. have a viscosity of 500 to 20,000 mPas, more preferably 1000 to 10,000 mPas.

The textured polyurethane molded articles containing multiple sheet layers of this invention comprise noncellular or cellular polyurethane as backing layer (c) and as support material, whereby preferably used is flexible, semi-rigid or rigid polyurethane foam. Processes for the preparation of non-cellular or cellular polyurethanes particularly polyurethane foams are adequately known in the literature and in patents so that further information will not be presented here. Examples are however, as previously cited *High Polymers* Vol. XVI, Polyurethanes; *The Plastics Handbook*, Vol. VII, Polyurethanes; and Federal Republic of Germany Application 31 27 914 or Federal Republic of Germany Application 27 32 292.

For particular applications, it may be advantageous if backing layer (c) made from non-cellular or cellular polyurethane also contains an insert and/or reinforcing material.

Typical inserts are made from metallic materials such as, for example, aluminum, copper, brass or sheet steel; or plastic such as, for example, polyamide, polybutyleneterephthalate, or mixtures of polymers, polyamides and/or polyesters.

Typical reinforcing materials are: short or long fibers such as, for example, glass fibers, carbon fibers, organic synthetic fibers or natural fibers such as aromatic polyamide, polyester fibers or cellulose fibers as well as woven materials, mats or non-wovens of such fibers.

In preparing said textured polyurethane molded articles having multiple sheet layers, a coating for forming coating layer (a) is, for example, applied and/or sprayed on to a textured mold optionally sprayed with internal release agent and heated to 60° C. to 150° C., more preferably 80° C. to 130° C. The mold may be from a number of materials such as for example, epoxide polyester resin compositions or preferably from metallic materials such as aluminum, cast iron, steel or stainless steel. After the coating layer exhibits a sufficiently high viscosity, i.e. no longer flowable and is partially or completely dried, this is then coated at a temperature within a range previously cited with a composition to form the urethane and/or urea group containing film of middle layer (b). The composition cures on the mold's internal surface and with the coating layer forms a sufficiently bonded composite film which can be easily removed from the surface of the mold.

The composition can be applied to the tempered, mold surface possessing a coating layer using known methods such as for example, by coating, brushing or spraying. According to preferred embodiments, the heat curable composition is either sprayed onto the heated mold surface or most preferably, the heated mold is submerged in a bath of the composition.

However, the coating methods cited above can also be combined with one another whereby efficaciously at least two of the methods are used. For example, a film having a uniform thickness layer can be prepared by submerging the heated mold in a bath of the composition which preferably has a temperature of 80° C. to 150° C., more preferably 90° C. to 130° C. for a certain time period. As soon as the cured composition on the heated mold surface has achieved the desired thickness then the mold is removed from the bath and the excess non-cured composition is removed and the composite film formed is removed from the mold. However, it is also possible to remove the mold with the composite film layer formed from the bath and to increase and optionally modify the thickness layer of the film in certain areas, for example, by spraying with the same or with another composition. Following the methods described, for example, from an urea group forming composition, a film containing urea-forming groups can be prepared and this film can be completely or partially coated with a urea and urethane group forming composition and in this manner, the mechanical properties of the film prepared can be varied. Obviously, the heated mold, for forming a multiple sheet film, can be submerged sequentially in multiple baths with different types of compositions. Depending on the desired type of modification of the film, one can use different compositions in any sequence successfully. As already stated, after the composition cures on the mold, the composite film formed can be removed without difficulty.

The films suitable as middle layer (b) and prepared according to the processes described preferably have a thickness of 10 to 20,000 microns, more preferably 800 to 3,000 microns. Such film thicknesses can be achieved, for example, by spraying with the required quantity of composition, efficaciously with a quantity of 15 to 30,000 g/m², more preferably 1,500 to 6,000 g/m². According to a preferred process, the heated mold is submerged in a bath of the composition as a function of mold temperature, coating layer (a), composition temperature and desired film thickness, for a certain time, for example, from 0.5 to 5 minutes, more preferably 1 to 4 minutes, and the composition is allowed to cure on the surface of the mold.

The film with a coating as covering layer (a) and with middle layer (b) comprising urethane and/or urea groups, which also can be designated as a composite film, can be treated directly after its preparation in the mold under the aforesaid reaction conditions with a reactive, blowing agent free or preferably blowing agent containing mixture to form the polyurethane. The polyurethane forming reaction mixture here is filled or sprayed under pressure into the hollow space of the mold whose interior surface is coated with the composite film and in this heated mold, which can remain open or closed after filling, the mixture cures.

According to a preferred process, the film containing cured multiple sheet layered composite film of coating layer and urethane and/or urea groups is removed from the mold and subsequently is either directly or after interim storage in a separate processing step poured in place in a conventional fashion with a reactive foaming mixture to form the polyurethanes, or is treated with a blowing-agent-free reaction mixture, for example, by filling the hollow cavity of the composite film, and the reaction mixture is allowed to cure.

The textured multiple sheet-layer-containing polyurethane molded articles are used as construction elements in different industrial areas. Said articles are particularly suited as construction elements in transportation, for example, as instrument panels or as coverings for doors or as compartment shelves in automobiles.

EXAMPLE

Preparation of a Storage Stable Heat Curable Composition 37 parts by weight of dimeric uretdione group-containing 2,4-toluene diisocyanate was dispersed in a mixture of:

39.48 parts of a polyoxypropylene(81.5 weight percent)-polyoxyethylene-(18.5 weight percent)glycol having an average molecular weight of 3,500;
20.00 parts by weight of a trifunctional polyether polyol having an average molecular weight of 4,800 prepared by the addition polymerization of 1,2-propylene oxide on trimethylolpropane and the subsequent addition polymerization of ethylene oxide on the resulting trimethylolpropane-polyoxypropylene-adduct; and
9.41 parts by weight of a trifunctional polymer modified polyether polyol having an average molecular weight of 4,000 prepared by the addition polymerization of 1,2-propylene oxide (86 weight percent) on glycerin as an initiating molecule, the subsequent addition polymerization of 14 weight percent ethylene oxide to the resulting glycerin polyoxypropylene-adduct, and by dispersing a synthetically prepared magnesium aluminum silicate (Transpafill ® from the Degussa Company) as a filler in a weight ratio of polyoxypropylene-polyoxyethylene-triol to filler of 85:15;

at 23° C. with the help of a stirrer at 1,000 rpm for 5 minutes. Over 2 minutes the following was dispersed into the aforesaid resulting dispersion: 0.96 parts by weight of a 50 weight percent solution in ethylene glycol of a reaction product prepared by reacting 1 mole of 3,3'-dimethyl-4,4'-diamino-dicyclohexylmethane with 2 moles of oleic acid at 23° C.

An easily flowing dispersion was obtained and while stirring at 23° C., the following were incorporated into the dispersion:

1.0 part by weight of trimethylolpropane;
3.62 parts by weight of ethylene glycol;
0.52 part by weight of a 24 weight percent solution of lead(II)naphthenate in naphthenic acid;
20.0 parts by weight of polyoxypropylene glycol having a molecular weight of 600; and
5 parts by weight of 1-methyl-3,5-diethyl-2,4-diaminobenzene.

The resulting composition was storage stable for more then 12 months and at 23° C. had a viscosity of 2775 mPas.

Preparation of a Polyurethane Semi-Rigid Foam for Pouring in Place Foaming of the Multiple Layer Film i Component: a mixture comprising:
84 parts by weight of a polyoxypropylene(86 weight percent)-polyoxyethylene(14 weight percent)-triol, initiated with glycerin, having a hydroxyl number of 28;
5 parts by weight of a graft polyether polyol prepared by in situ polymerization of 20 parts by weight of a mixture of styrene and acrylonitrile in a weight ratio of 1:1 in a polyoxypropylene(86 weight percent)-polyoxyethylene(14 weight percent)-triol, initiated with glycerin, having a hydroxyl number of 28;
0.5 parts by weight of triethanolamine;
2.5 parts by weight of water;
5.0 parts by weight of a polyether polyol having a hydroxyl number of 768 prepared from ethylene diamine as an initiator and 1,2-propylene oxide;
0.4 parts by weight of a foam stabilizer based on a silicon (Tegostab ® B4690 from Goldschmidt AG, Essen West Germany); and
0.6 parts by weight of a 40 weight percent aqueous potassium acetate solution.
ii Component: A mixture of diphenylmethanediisocyanates and polyphenyl-polymethylene-polyisocyanates (polymeric MDI) having an NCO content of 31 ±1 weight In preparing the semi-rigid polyurethane foam for pouring in place, the A and B components were intensively mixed together at 23° C. in a weight ratio of 100:55 and then the reaction mixture was applied to the backside of the film coated with the polyurethane coating and was allowed to cure there.

Preparation of the Molded Article

An electrically heatable mold made of cast iron in the shape of an automobile glove compartment at a mold temperature of 110° C. and having a textured mold surface was sprayed with a wax dissolved in a hydrocarbon (Acmos ® 180 ST-5 from the Acmos Company) as a release agent.

Subsequently, the surface of the mold was sprayed at 6 g/m² with a light-resistant polyurethane coating based on an aromatic polyester polyol and a modified hexamethylene diisocyanate (Commercial product: a dual component polyurethane coating No. GG 01-8101 from BASF-Farben and Lacke AG) at a pressure of 3 bar.

After drying for 60 seconds, the composition was poured into the hollow cavity of the mold as per Example 1a and it uniformly distributed itself over the internal surface of the mold coated with the polyurethane coating.

Excess composition was removed after 20 seconds by pouring from the hollow cavity of the mold.

After curing for 60 seconds, the film coated with the polyurethane coating was removed from the mold and poured in place with the reactive mixture of Example 1b to form the polyurethane foam.

The embodiments of the invention in which an exclusive privilege or property is claimed are defined as follows:

1. Textured polyurethane molded articles having multiple sheet layers, comprising:
   (a) an outer coating layer;
   (b) an extensible middle layer of a sheet containing urethane and/or urea groups and having a thickness of from about 10 μm to about 20,000 μm; and
   (c) a backing layer made from noncellular or cellular urethane;

wherein the middle layer (b) comprising a sheet containing urethane and/or urea groups is prepared by curing at from 60° to 150° C. a heat curable mixture, storage stable at room temperature, which comprises:
   (i) an organic polyisocyanate;
   (ii) at least one compound having at least two hydrogen atoms reactive to isocyanate groups and having an average molecular weight of from 250 to 8500, whereby a room temperature solid organic polyisocyanate (i), in the form of distinct particle shaving a particle diameter of from 0.1 to 150 microns, is deactivated on the particle surface by a chemical reaction with a deactivating agent so that from 0.1 to 20 equivalent percent of the total available isocyanate groups from (i) are reacted with the deactivating agent and the resulting surface modified polyisocyanate is dispersed into at least one compound having two hydrogen atoms reactive to isocyanate groups;
   (iii) chain extending agents and/or cross-linking agents having an average molecular weight of from 62 to 500 and having an average functionality of from 2 to 4; and
   (iv) catalysts.

2. The textured polyurethane molded articles of claim 1 wherein a reaction product is used as the deactivating agent which is prepared from one mole of an organic amine having from 2 to 32 carbon atoms, selected from the group consisting of aromatic, aliphatic, cycloaliphatic, cycloaliphatic-aliphatic and aromatic-aliphatic diamines, and mixtures thereof, and from 1.5 to 2.5 moles of an organic monocarboxylic acid or its anhydride having at lest 6 carbon atoms or aryl sulfonic acid.

3. The textures polyurethane molded articles of claim 1 wherein a reaction product is used as the deactivating agent which is prepared from one mole of an aliphatic, cycloaliphatic, or cyclophatic-aliphatic diamine having from 6 to 18 carbon atoms and from 1.8 to 2.2 moles of an aliphatic monocarboxylic acid having at least 12 carbon atoms.

4. The textured polyurethane molded articles of claim 1 wherein a reaction product is used as the deactivating which is prepared from 1 mole of 3,3'-dimethyl, 4,4'-diaminodicyclohexylmethane and approximately 2 moles of oelic acid and/or stearic acid.

5. The textured polyurethane molded articles of claim 1 wherein the catalyst (iv) is selected from the group consisting of lead naphthenate, bismuth(III)stearate, zinc stearate, lead(II)octanoate, tin octanoate, phenylmercury octanoate, iron(III)acetyl acetonate, iron(II)acetyl acetonate, cobalt(II)acetyl acetonate, zinc(II)acetyl acetonate, titanium(IV)acetyl acetonate, zirconium(IV)acetyl acetonate, bislauryltin-dimercaptide, 2,3,4,6,7,8,9,10-octahydro-pyramido-1,2-azepine or mixtures of at least two said catalysts.

6. The textured polyurethane molded articles of claim 1 wherein the heat curable mixture has a viscosity of from 500 to 20,000 mPas at 23° C.

7. The textured polyurethane molded articles of claim 1 wherein the covering layer (a) is a polyurethane coating.

* * * * *